(12) United States Patent
Murrah et al.

(10) Patent No.: US 7,995,060 B2
(45) Date of Patent: Aug. 9, 2011

(54) MULTIPLE ARTISTIC LOOK RENDERING METHODS AND APPARATUS

(75) Inventors: John T Murrah, Burbank, CA (US); Henry Allen Driskill, Burbank, CA (US); Colin Eckart, Burbank, CA (US); Donald Adolph Lusinsky, Burbank, CA (US); Sean D Jenkins, Burbank, CA (US); Patrick Dalton, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 839 days.

(21) Appl. No.: 11/832,569

(22) Filed: Aug. 1, 2007

(65) Prior Publication Data
US 2009/0033662 A1 Feb. 5, 2009

(51) Int. Cl.
*G06T 15/50* (2011.01)
(52) U.S. Cl. ........................................ 345/426
(58) Field of Classification Search .................. None
See application file for complete search history.

(56) References Cited

U.S. PATENT DOCUMENTS

| | | | |
|---|---|---|---|
| 5,847,712 A | 12/1998 | Salesin et al. | |
| 6,268,865 B1 | 7/2001 | Daniels et al. | |
| 7,158,138 B1 * | 1/2007 | Bronskill et al. | 345/441 |
| 7,176,917 B1 * | 2/2007 | Morgan et al. | 345/426 |
| 2004/0056858 A1 * | 3/2004 | Ohba et al. | 345/419 |
| 2006/0023923 A1 * | 2/2006 | Geng et al. | 382/116 |
| 2007/0132755 A1 * | 6/2007 | Kim et al. | 345/419 |
| 2008/0284791 A1 * | 11/2008 | Bressan et al. | 345/589 |

OTHER PUBLICATIONS

International Search Report PCT/US2008/071717 dated Nov. 13, 2008.

* cited by examiner

*Primary Examiner* — Said Broome
(74) *Attorney, Agent, or Firm* — Kilpatrick Townsend & Stockton LLP (57) ABSTRACT

A computer system comprises a memory configured to store a geometric description of an object, wherein the memory is configured to store a first set of parameters associated with a first artistic look, and wherein the memory is configured to store a second set of parameters associated with a second artistic look, and a processor coupled to the memory, wherein the processor is configured to determine a first set of rendered data in response to the first set of parameters and to the geometric description of the object, wherein the processor is configured to determine a second set of rendered data in response to the second set of parameters and to the geometric description of the object, and wherein the processor is configured to determine a visual representation for the object in response to the first set of rendered data and in response to the second set of rendered data.

24 Claims, 7 Drawing Sheets

MULTIPLE ARTISTIC LOOK RENDERING METHODS AND APPARATUS

BACKGROUND OF THE INVENTION

The present invention relates to computer generated imagery. More specifically, the present invention relates to rendering methods and apparatus based upon scenes (models)/objects that are rendered in different artistic styles or looks.

Throughout the years, movie makers have often tried to tell stories involving make-believe creatures, far away places, and fantastic things. To do so, they have often relied on various techniques to bring the make-believe to "life." Two of the major techniques have traditionally included, drawing-based animation techniques and stop motion animation techniques.

Drawing-based animation techniques were refined in the twentieth century, by movie makers such as Walt Disney and used in movies such as "Snow White and the Seven Dwarfs" (1937) and "Fantasia" (1940). These animation techniques typically required artists to hand-draw (or paint) animated images onto a transparent media or cels. After painting, each cel would then be captured or recorded onto film as one or more frames in a movie.

Stop motion-based animation techniques typically required the construction of miniature sets, props, and characters. The filmmakers would construct the sets, add props, and position the miniature characters in a pose. After the animator was happy with how everything was arranged, one or more frames of film would be taken of that specific arrangement. Stop motion animation techniques were developed by movie makers such as Willis O'Brien for movies such as "King Kong" (1933). Subsequently, these techniques were refined by animators such as Ray Harryhausen for movies including "Mighty Joe Young" (1948) and Clash Of The Titans (1981).

With the wide-spread availability of computers in the later part of the twentieth century, filmmakers began to rely upon computers to assist in the process of generating images. This became known in the industry as computer generated imagery, or CGI. CGI includes using computers to facilitate production of animated features, such as "Chicken Little" (2005), Walt Disney's first full-length movie that included only computer generated. CGI also includes using computers to generated images that are combined with live-action action, such as in "Pirates of the Caribbean: At World's End" (2007).

The inventors of the present invention recognize the ability of CGI to greatly facilitate the generation of images, however, the inventors also recognize that CGI has its limitations. For example, as computer processing power and memory capacities have greatly increased, some in the industry seem to be more concerned with accuracy and precision of the generated images at the expense of artistic license. For example, some filmmakers now exhaustively capture facial and body motion of actors on a stage as the basis of CGI characters, instead of allowing users (e.g. animators) to use their creative instincts and insights. As another example, some users in the industry rely upon computationally intensive techniques such as radiosity, ray tracing, photon mapping, etc. to generate photorealistic CGI images, instead of allowing users (e.g. animators, art directors, etc.) to apply their artistic talents.

In light of the above, what is desired are improved methods and apparatus for providing more artistically driven CGI images.

BRIEF SUMMARY OF THE INVENTION

The present invention relates to computer generated imagery. More specifically, the present invention introduces the notion of mixing artistic looks to render an image of an object and/or a scene (model).

As will be used herein, rendering or rendering processes refers to a simulation of light transport throughout a scene and back-end image compositing processes. In various embodiments, an artistic look typically refers to a rendering of an object and/or a scene (more generally, a model) according to artistic principles. That is, rendering of a description (e.g. mathematical) of a model (e.g. object model, scene model) to obtain rendered data (e.g. an image, a rendered image) that attempts to achieve a particular artistic expression or style, i.e. a painterly look. The rendered data may itself be used as input to other rendering processes. This desire to achieve an artistic look for CGI is in contrast to the photorealistic rendering described above (e.g. physical simulation based animation).

In light of the above, the inventors of the present invention have discovered that to give rendered objects/scenes a more painterly look, different portions of the images may be subject to a different artistic looks. For example, in bright portions of an image, it is desirable to "paint" in a first style that includes detailed textures. Further, in shadowed portions of an image, it is desirable to "paint" in a different style that includes textures of low detail.

Embodiments of the present invention distinguish over traditional rendering optimization rendering techniques such as mipmapping, level of detail (LOD) changes, and the like. Those techniques are primarily geared to reducing computational rendering operations for objects that are far away from the viewer by reducing the sizes of texture maps. As an example of mipmaps, a portion of wall in front of the viewer may be associated with a large 1024×1024 bit texture map, while a portion of a wall far away from the viewer may be associated with a small 16×16 bit texture map representing a sub-sampled version of the 1024×1024 bit texture map. As an example of LOD changes, if a chair is in the foreground, it may be rendered based upon a 2 k polygon model, whereas if the same chair is in the background, it may be rendered based upon a 200 polygon model. By using simpler textures and or models of objects for rendering objects far away from the user (i.e. less data), these techniques attempt to reduce rendering times. These techniques, however, do not impart any different artistic looks to the images of objects in a scene.

As will be described in various embodiments below, a visual representation of an object and/or a scene may be rendered according to a combination of one or more artistic looks for the object/scene. These different artistic looks may be effected by using different sets of texture maps, shaders, geometric descriptions, or the like.

In various embodiments, the visual representations of an object/scene having different looks may be combined to form a modified visual representation of the object/scene. The combination may be a weighted combination, wherein the weighting is based upon a reference image, rendering metrics, or the like.

In some embodiments, a user may select one artistic look over another artistic look for different portions of a rendered image. In some cases, the selection may be based upon scene (model) properties or parameters, such as scene depth at a given location, the convergence point for a three-dimensional scene, or the like. In some cases, the selection may be based upon properties of a rendered image, such as brightness of pixels, or the like. In some cases, the selection may be based upon a combination of model parameters, rendered image parameters, and the like. In still other embodiments, other parameters may be used to select one artistic look over others, such as motion or animation of an object within a scene, depth of field considerations, and the like.

In some embodiments, a specified region in the visual representations of the object/scene is desired to be the main point of interest in the visual representation. In such embodiments, a visual representation (e.g. an image) having a first look may be more heavily weighted around the main point of interest; and a visual representation (e.g. an image) having a second look may be more heavily weighted outside the main point of interest.

According to one aspect of the invention, methods for a computer system are disclosed. One technique includes rendering an object in a scene in a first artistic style in response to a description of the object to determine a first set of rendered data (e.g. an image), rendering the object in the scene in a second artistic style in response to the description of the object to determine a second set of rendered data, and determining weighting data associated with the object. A process includes determining a representation of the object in the scene in response to the first set of rendered data, in response to the second set of rendered data, and in response to the weighting data associated with the object, determining an image in response to the representation of the object in the scene, and outputting the image to a user.

According to another aspect of the invention, computer systems are disclosed. One apparatus includes a memory configured to store a geometric description of an object, wherein the memory is configured to store a first set of parameters associated with a first artistic look, and wherein the memory is configured to store a second set of parameters associated with a second artistic look. A system includes a processor coupled to the memory, wherein the processor is configured to determine a first set of rendered data in response to the first set of parameters and to the geometric description of the object, wherein the processor is configured to determine a second set of rendered data in response to the second set of parameters and to the geometric description of the object, and wherein the processor is configured to determine a visual representation for the object in response to the first set of rendered data and in response to the second set of rendered data.

According to one aspect of the invention, a computer program product for a computer system including a processor is described. The computer program product may include code configured to direct the processor to determine a first set of rendered data associated with an object in response to a first set of parameters associated with the object, and in response to a geometric description of the object, and code configured to direct the processor to determine a second set of rendered data associated with the object in response to a second set of parameters associated with the object, and in response to a geometric description of the object. A computer program product may also include code configured to direct the processor to determine a visual representation for the object in response to the first set of rendered data and in response to the second set of rendered data. The codes typically reside on a tangible media, such as a semiconductor media (e.g. RAM, flash memory), magnetic media (e.g. hard disk, SAN), optical media (e.g. CD, DVD, barcode, holograph), or the like.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings.

DETAILED DESCRIPTION OF THE INVENTION

Figure 1:
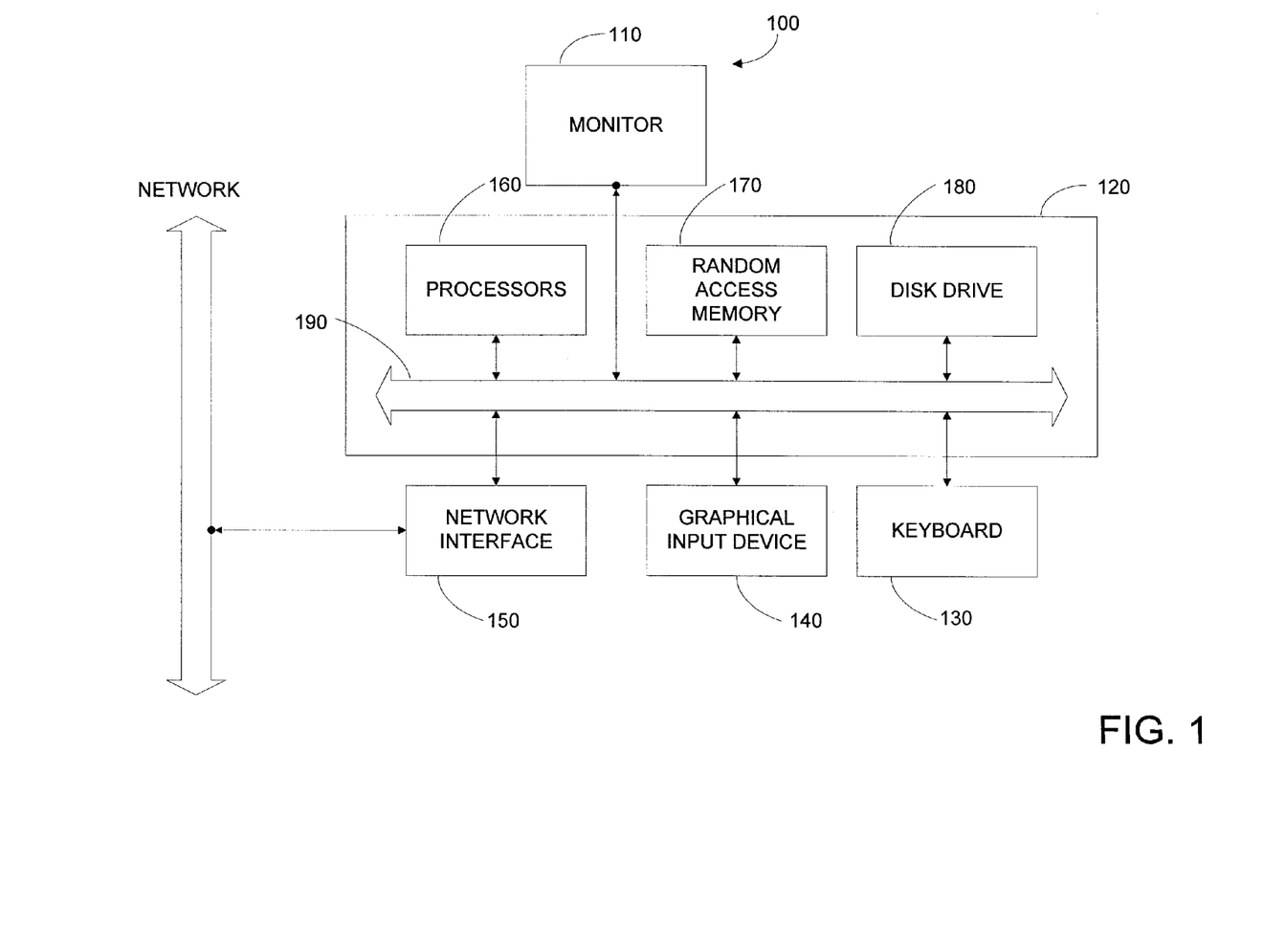
FIG. 1 is a block diagram of typical computer system 100 according to an embodiment of the present invention.

FIG. 1 is a block diagram of typical computer system 100 according to an embodiment of the present invention.

In the present embodiment, computer system 100 typically includes a monitor 110, computer 120, a keyboard 130, a user input device 140, computer interfaces 150, and the like.

In the present embodiment, user input device 140 is typically embodied as a computer mouse, a trackball, a track pad, a joystick, wireless remote, drawing tablet, voice command system, eye tracking system, and the like. User input device 140 typically allows a user to select objects, icons, text and the like that appear on the monitor 110 via a command such as a click of a button or the like.

Embodiments of computer interfaces 150 typically include an Ethernet card, a modem (telephone, satellite, cable, ISDN), (asynchronous) digital subscriber line (DSL) unit, FireWire interface, USB interface, and the like. For example, computer interfaces 150 may be coupled to a computer network, to a FireWire bus, or the like. In other embodiments, computer interfaces 150 may be physically integrated on the motherboard of computer 120 and/or include software drivers, or the like.

In various embodiments, computer 120 typically includes familiar computer components such as a processor 160, and memory storage devices, such as a random access memory (RAM) 170, disk drives 180, and system bus 190 interconnecting the above components.

In one embodiment, computer 120 includes one or more Core™ microprocessors from Intel. Further, in the present embodiment, computer 120 typically includes a UNIX-based operating system.

RAM 170 and disk drive 180 are examples of tangible media configured to store embodiments of the present invention including computer-executable code implementing techniques described herein, data such as image files, object/scene (models) including geometrical descriptions of objects, shaders and shading parameters, geometric descriptions of objects, procedural descriptions of models, scene descriptor files and scene parameters, texture maps, a rendering engine, executable computer code, or the like. Other types of tangible media include floppy disks, removable hard disks, optical storage media such as CD-ROMS, DVDs and bar codes, semiconductor memories such as flash memories, read-only-memories (ROMS), battery-backed volatile memories, networked storage devices, and the like.

In various embodiments, computer system 100 may also include software that enables communications over a network such as the HTTP, TCP/IP, RTP/RTSP protocols, and the like. In alternative embodiments of the present invention, other communications software and transfer protocols may also be used, for example IPX, UDP or the like.

FIG. 1 is representative of a computer system capable of embodying the present invention. It will be readily apparent to one of ordinary skill in the art that many other hardware and software configurations are suitable for use with the present invention. For example, the computer may be a desktop, portable, rack-mounted or tablet configuration. Additionally, the computer may be a series of networked computers. Further, the use of other micro processors are contemplated, such as Xeon™, Pentium™ or Itanium™ microprocessors from Intel; Turion™ 64 or Opteron™ microprocessors from Advanced Micro Devices, Inc; and the like. Further, other types of operating systems are contemplated, such as Vista™ or WindowsXP™ or the like from Microsoft Corporation, Solaris™ from Sun Microsystems, LINUX, UNIX, and the like. In still other embodiments, the techniques described above may be implemented upon a chip or an auxiliary processing board (e.g. graphics processor unit).

Figure 2A:
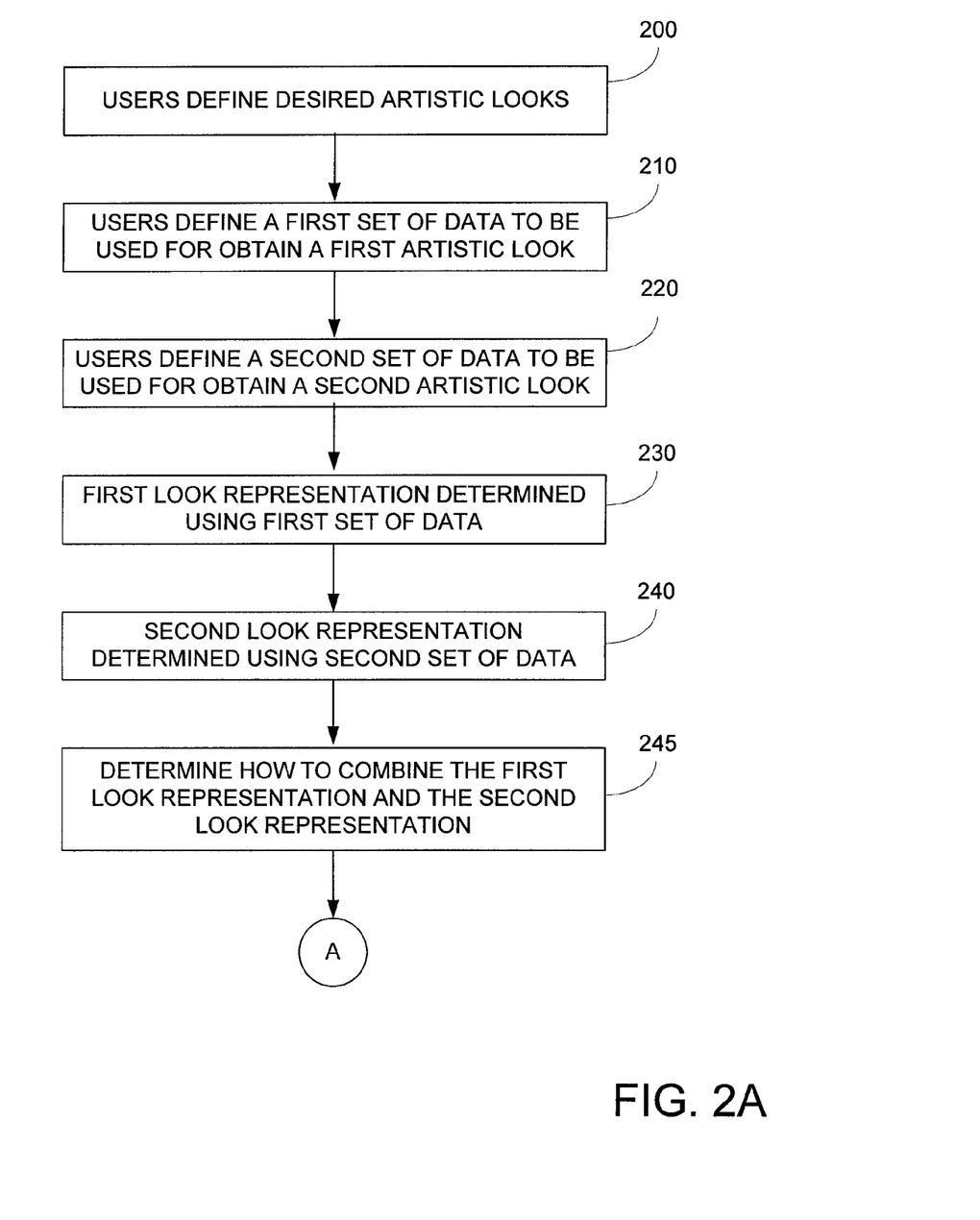
FIGS. 2A-B illustrate a block diagram of a process according to one embodiment of the present invention.
Figure 2B:
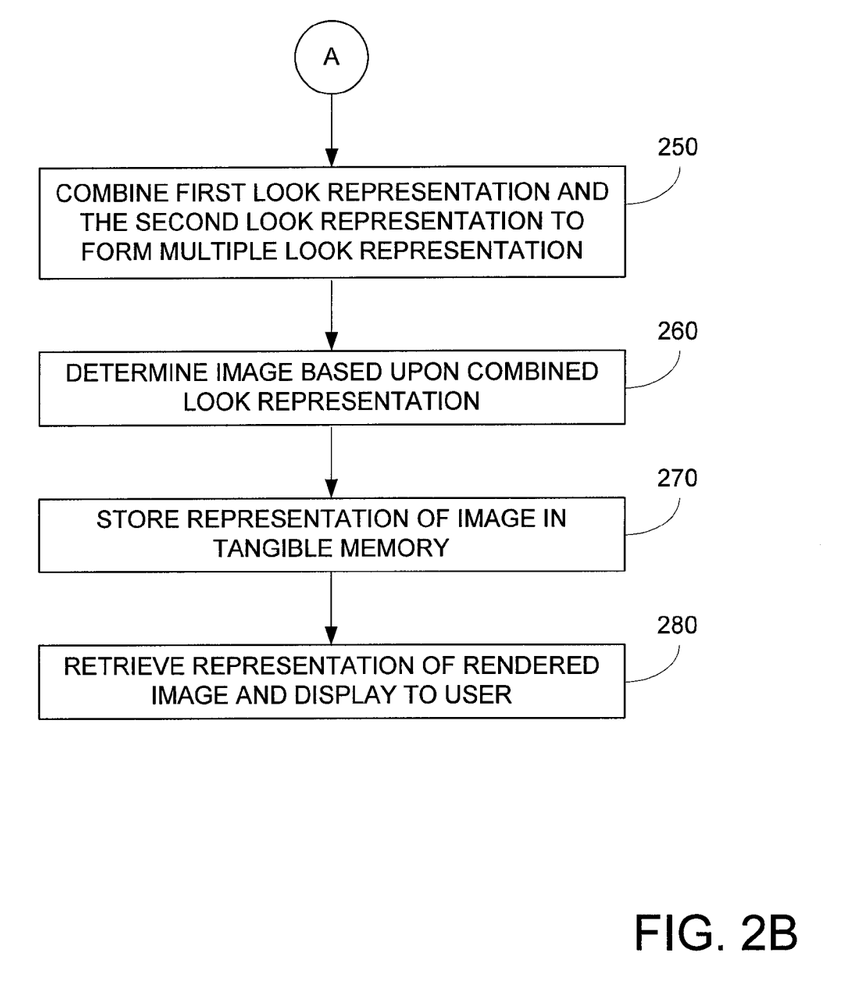

FIGS. 2A-B illustrate a block diagram of a process according to one embodiment of the present invention.

Initially, in FIGS. 2A-B, a number of artistic looks for an object/scene are defined, step 200. This may include at least a first artistic look and a second artistic look. In some embodiments, the artistic look may be specified by users such as a Director, Artistic Director, or the like. As will be illustrated below in some examples, the artistic looks attempt to simulate how an artist would emphasize or deemphasize different parts of an image based upon artistic criteria.

Next, a first set of parameters used to implement the first artistic look for an object/scene are determined, step 210. The parameters used to create the first artistic look may be defined by users such as modelers, animators, shaders, and the like. In various embodiments, the parameters used to create the first artistic look may typically include any number of rendering parameters. As merely examples, the different parameters may include: a first geometric specification for an object or a scene, a first set of texture maps, a first set of shaders, a first set of lighting and camera parameters, and the like.

In various embodiments, a second set of parameters used to implement the second artistic look for an object/scene are determined, step 220. The parameters used to create the second artistic look may also be defined by users such as modelers, animators, shaders, and the like, at the same time as step 210, above, or separately. Similar to the above, in various embodiments, the parameters used to create the second artistic look may also include any number of rendering parameters such as: a second geometric specification (different from the first geometric specification), a second set of texture maps, a second set of shaders, or the like.

In various embodiments of the present invention, the first set of parameters and the second set of parameters may have parameters in common. In other words, the first set of parameters and the second set of parameters need not be exclusive of each other to achieve the different artistic looks.

In FIGS. 2A-B, at rendering time, the first set of parameters is used to determine (render) a first in-memory representation of the object/scene, step 230. Additionally, the second set of parameters is used to determine (render) a second in-memory representation of the object/scene, step 240. In various embodiments, the resolution of the in-memory representations may be 2 k×1 k pixels, 4 k×2 k pixels, or the like. In some embodiments, the in-memory resolution may be higher, e.g. 16 k×8 k pixels, 8 k×4 k pixels, 4 k×2 k pixels, etc. This resolution may be different from a resolution for a final image (e.g. 2 k×1 k pixels). In various embodiments, the in-memory representation of the object may also be termed a set of rendered data, a rendered image, or the like. In the latter case, it should be understood that a rendered image need not be viewed by a user to be considered an image. Instead, the rendered image simply represents a data construct in memory that stores output values as a result of the rendering process.

In various embodiments, the first or the second in-memory representation of the object/scene need not be rendered for every pixel. For example, it may be known ahead of time that values of a set of pixels in the first in-memory representation of the object/scene are not needed for the subsequent computations discussed below. Accordingly, in such embodiments, values for these set of pixels for the first artistic look are not performed, thus reducing rendering time.

In various embodiments of the present invention, a combination of the first in-memory representation and the second in-memory representation may be performed to determine a combined in-memory representation, step 250. In some embodiments of the present invention, the weighted combination is a linear combination, non-linear combination, logical combination, or the like of the pixel values of the in-memory representations.

In some embodiments, a weighting image is defined by a user such as a Director, Artistic Director, or the like, step 245. The weighting image may specify a pixel-by-pixel weighting of the first in-memory representation and the second in-memory representation when determining the combined in-memory representation. In some examples, the weighting image may be "painted" by a user using any conventional painting program.

In various embodiments, the weighting image may be dynamically determined based upon the results of rendering operations. As an example, the lightness of pixels in the first or second in-memory representation may be used to determine a weighted image. In another example, shadow map operations, thickness map operations, or the like may be used to determine a weighted image. In various examples, the weighting image may be a dynamic data construct or computation stored on memory (e.g. disk memory), and not an image to be viewed, per se.

In various embodiments, the weighting image may be based upon scene model parameters. As an example, the distance a surface is away from the camera, viewing plane, or the like may be used to determine weights for pixels in the a weighted image. In another example, surfaces near the convergence point in a three-dimensional representation may be biased with one artistic look, and surfaces further away from the convergence point may be biased with another artistic look.

In other embodiments of the present invention, the weighting data (e.g. image) may also be determined from a combination of scene model parameters, and image properties or metrics. For example, the weighting may be determined based upon distance a surface is away from the camera and the amount of illumination at the surface; the weighting data may be determined based upon motion of an object and whether the object is within the depth of field; or the like.

In some examples, the weighting image has a value from 0 to 255, where 0 represents 100% of the first in-memory representation value for a pixel, where 255 represents 100% of the second in-memory representation value for the pixel, 125 represents approximately 50% of the first and approximately 50% of the second in-memory representation value for the pixel, and the like. In some embodiments, when the contribution for one in-memory representation is below a threshold, for example 20%, the contribution may be ignored. Thus, for example, a weighting for a pixel for the first in-memory representation may range from 10% to 100%, 20% to 100%, or the like. Examples of weighting images are illustrated below.

In various embodiments of the present invention, steps 230-250 may be performed in an interleaved manner. For example, in one embodiment, steps 230-250 may be performed on a pixel-by-pixel basis, on a group of pixels at a time, or the like. As an example, for a first pixel, the first set of parameters is used to determine a first value, the second set of parameters is used to determine a second value, and then the first and second values are combined to form a combined value for the pixel. The process may then be repeated for the next pixel, and the like.

In various embodiments, after the combined in-memory representation is determined, a sampling may be performed on pixels to determine a value of a pixel in a resulting image, step 260. For example, 16 pixels in the combined in-memory representation may be sampled to determine the value for every pixel in the image. In other embodiments, any other number of pixels may be sampled to determine a value for pixels, such as nine pixels, four pixels, twenty five pixels, or the like. In various embodiments, the pixel resolution for the resulting image may be approximately 2 k×1 k (two megapixels), 4 k×2 k (eight megapixels), or the like. Further, the aspect ratio may be any ratio such as 16:9, 4:3, 2.39:1, or the like. In some embodiments, step 260 is not performed—the in-memory representation may have the same pixel resolution as the pixel resolution for the resulting image.

In various embodiments of the present invention, the resulting image may be stored in a tangible medium such as a semiconductor memory, magnetic disk, an optical disk, film media, or the like, step 270. Subsequently, the image or the representation of the image may be retrieved from the tangible medium, and displayed to a user, step 280. For example, the image may be displayed on a computer monitor, on a home entertainment system, a theater, a forum, or the like.

Figure 3A:
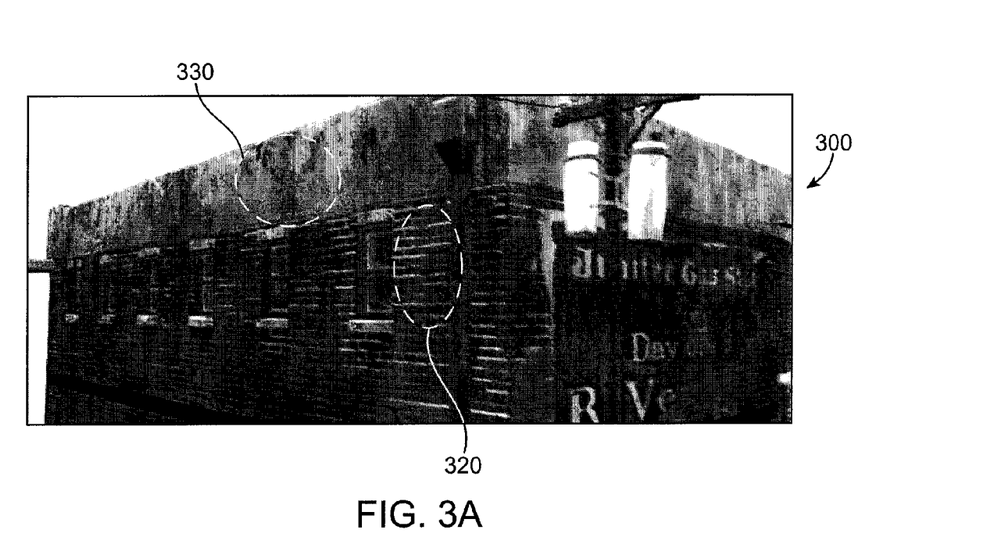
FIGS. 3A-D illustrate examples according to various embodiments of the present invention.
Figure 3B:
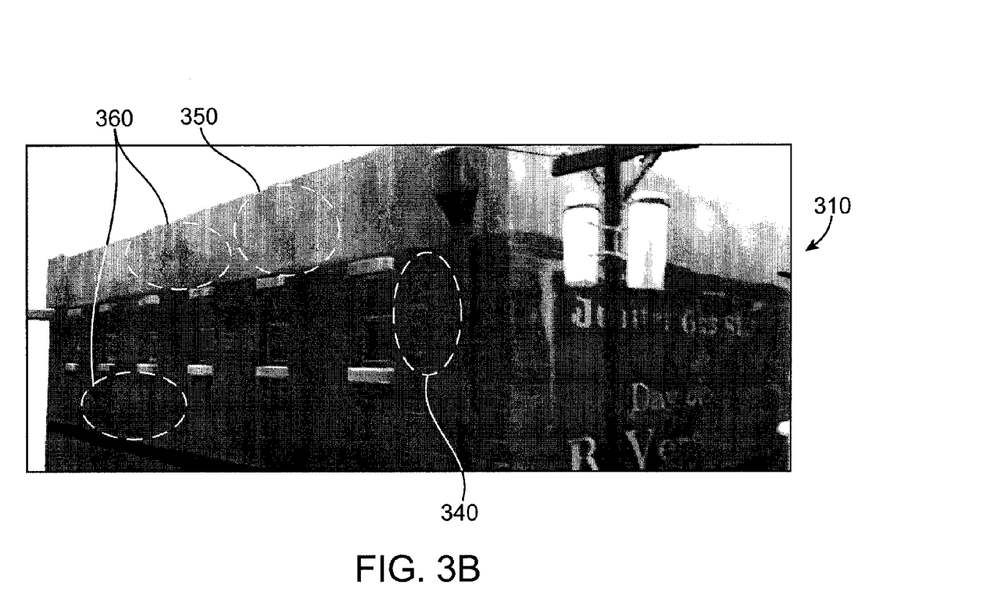

FIGS. 3A-D illustrate examples according to various embodiments of the present invention. More specifically, FIG. 3A illustrates an example of an image formed according to a first artistic look 300 for a scene, and FIG. 3B illustrates an example of an image formed according to a second artistic look 310 for the same scene.

As can be seen, look 300 includes many surface details such as high definition of bricks in region 320, texture detail of region 330, and the like. In contrast, the corresponding regions of look 310 have much less detail. In look 310, bricks in region 340 are not as well-defined as compared to bricks in region 320, there is little texture detail in region 350 compared to region 330, and the like. As can also be seen in this example, artistic look 310 includes regions 360 that have a "patchy" look. These patchy regions 360 are a characteristic of the second artistic look, and are not found in artistic look 300.

As discussed above, in various embodiments, the differences in appearance of look 300 to 310 may be a result of the use of different texture maps, the use of different geometric models, the use of different shaders and/or shading parameters, and the like.

Figure 3C:
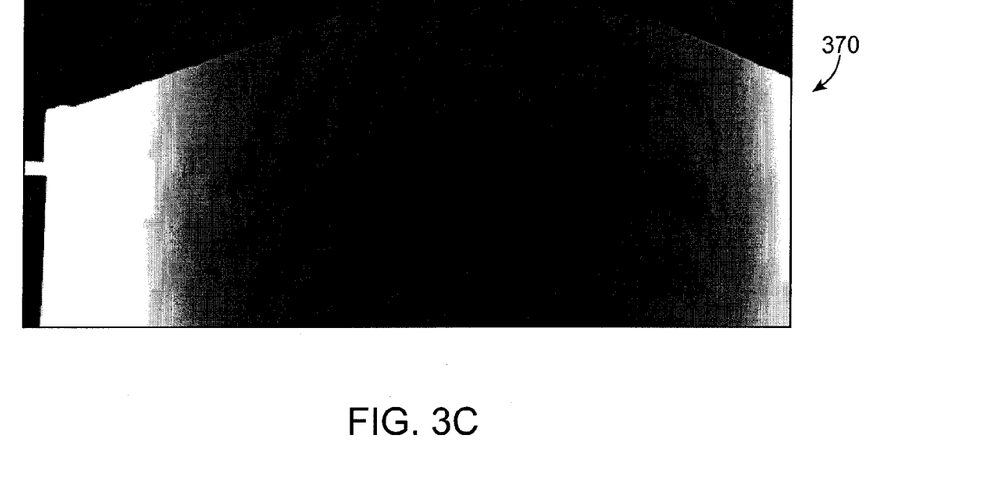

FIG. 3C represents an example according to an embodiment of the present invention. More specifically, FIG. 3C represents a weighting representation (image) 370. As discussed above, weighting image 370 may be specified by a user to represent a combination of look 300 and look 310. In various embodiments, the weighting may be a linear or non-linear combination. Additionally, the combination may be scaled. As an example, in FIG. 3C, the gray scale values of each pixel in weighting image 370 corresponds to a weighting of artistic look 300 and artistic look 310. In this example, when the grayscale value is less than 0.5 (from a scale 0.0 to 1.0), artistic look 300 is weighted more than artistic look 310, and when the grayscale value is more than 0.5, artistic look 310 is weighted more than artistic look 300 in a resultant image. In other embodiments, more than two artistic looks may be used and combined in a variety of ways In the example in FIG. 3C, the weighted representation 370 was computed based upon a model property or metric. More specifically, the weighting values represent a distance away from the camera, viewing plane, or the like. Since this data may be determined simply based upon the geometry of the scene, weighted representation 370 may be determined before the rendering process begins.

Figure 3D:
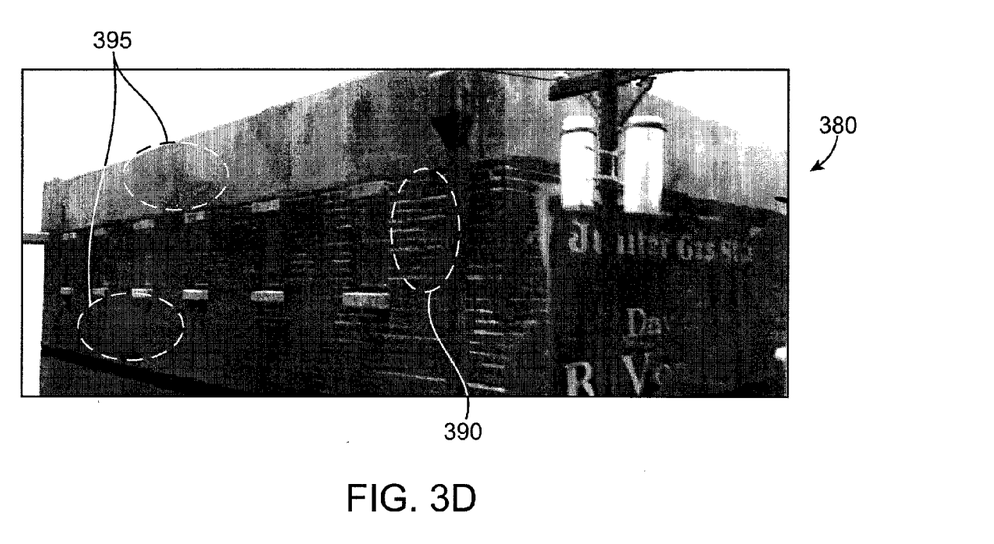

FIG. 3D represents a resultant image 380 formed by a combination of artistic look 300 and artistic look 310. For example, in resultant image 380, region 390 illustrates a high level of detail to the bricks contributed from artistic look 300; whereas region 395 illustrates a lower level of detail (e.g. a patchy look) to the bricks contributed from artistic look 310. As can be seen in this example, the artistic look obtained by resultant image 380 includes more abstract (e.g. patchy) regions and regions of higher detail at the same time. This type of artistic look blending provides striking results, and has not previously been performed.

FIGS. 4A-D illustrate examples according to various embodiments of the present invention. More specifically, FIGS. 4A-D illustrate a series of texture maps 400-430, and FIG. 4E illustrates a resultant image 440 illustrating a combination of artistic looks.

In this example, the weighting image or data used to specify the combination of artistic looks was based upon data determined that could be determined at render time. More specifically, because the weighting values represent a pixel brightness, the determination of transport of light in the scene and interaction with surfaces in the scene was performed to determine the weighting values.

Figure 4A:
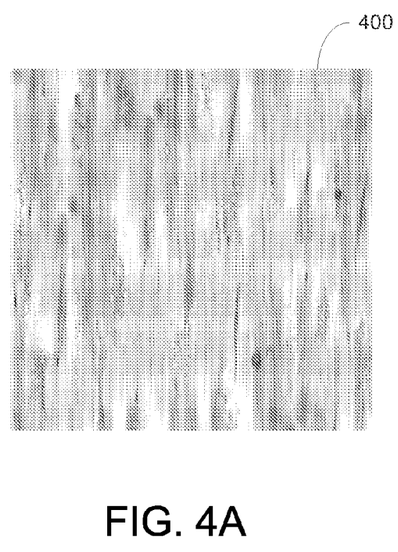
FIGS. 4A-E illustrate examples according to various embodiments of the present invention.
Figure 4B:
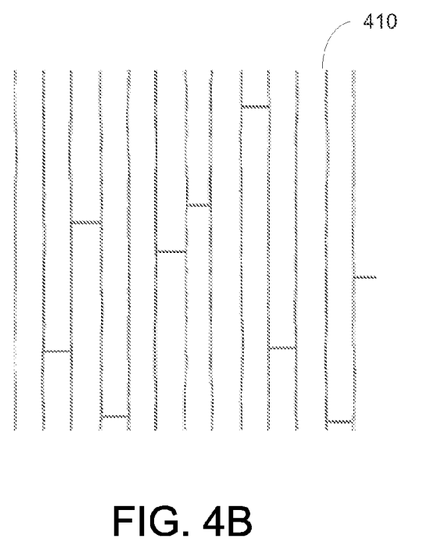
Figure 4C:
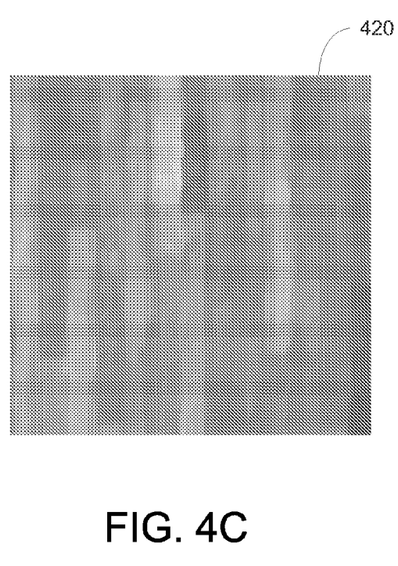
Figure 4D:
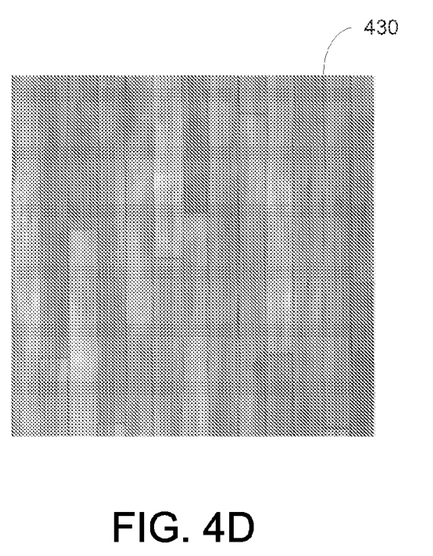

FIGS. 4A-C illustrate texture maps 400-420 used in an example for rendering images of wooden planks. For example, texture map 400 represents wood grain patterns, texture map 410 represents wood plank patterns, and texture map 420 represents wood coloring. FIG. 4D represents texture map 430 formed by combining texture maps 400-420. In various embodiments, texture map 430 may not be an explicitly stored texture map, but may be dynamically generated at a render time by combining texture maps 400-420.

Figure 4E:
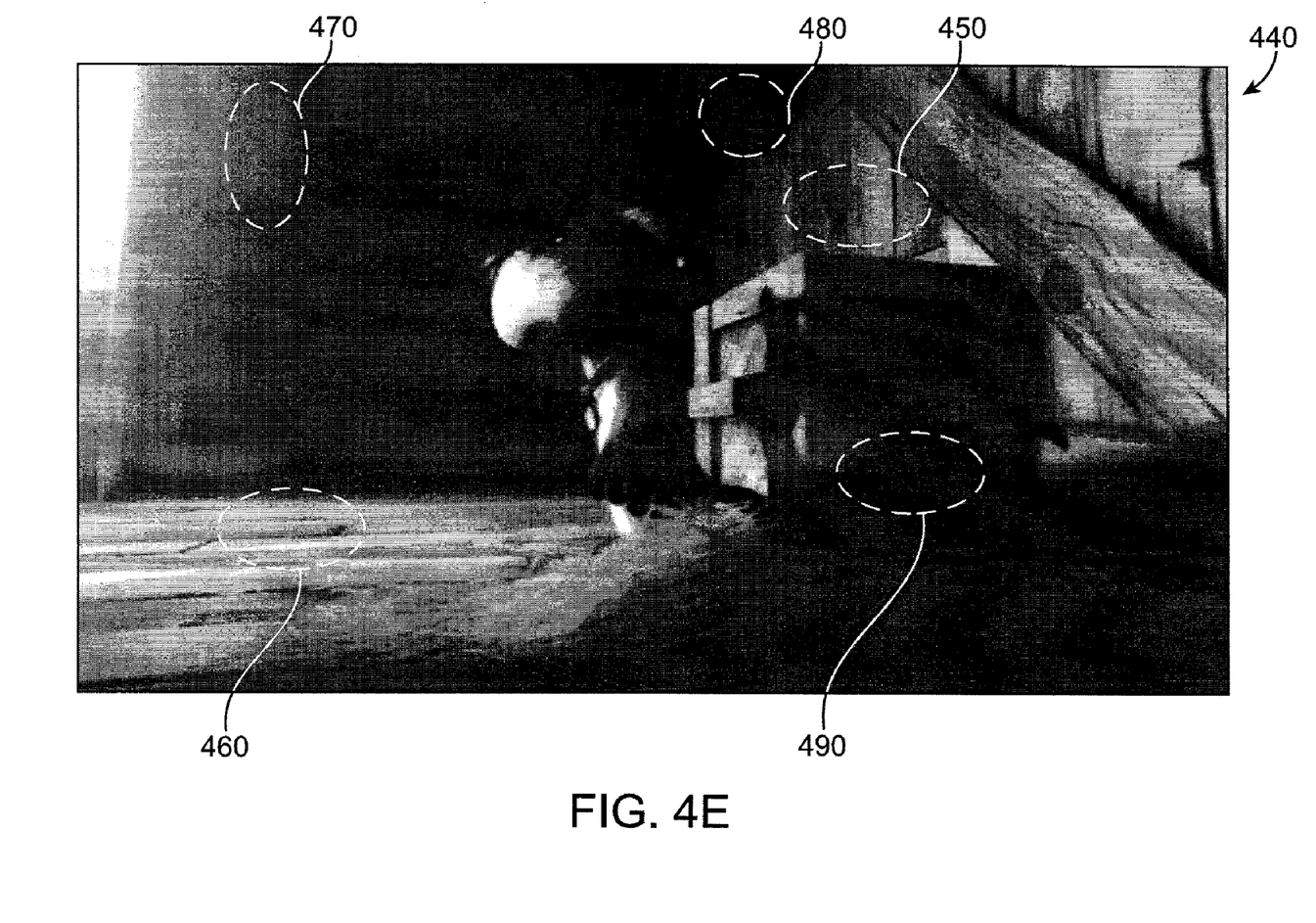

In the example in FIG. 4E, resultant image 440 is rendered according to desired artistic looks. In resultant image 440, regions 450 and 460 are illustrated to be brightly illuminated by an off-screen light source. In this example, texture map 430 (i.e. a combination of texture maps 400-420) is used as a texture map to render the wall (region 450) and floor surfaces (region 460). Accordingly, as can be seen, the wood grain pattern, wood plank patterns, and the like can clearly be seen.

Additionally, in simulated resultant image 440 region 470 is illustrated to have a high lightness value (due to the glare from the light of the open door in the image), and region 480 is illustrated to have a low lightness value (being in shadows). In an example, texture map 420 may be primarily used as a texture map for rendering the back-side of the door (region 470) and for rendering the wall in shadows (region 480). In an example, the wood plank of texture map 410 and the wood grain of texture map 400 are less prominent.

As yet another example, texture maps 400 and 420 can primarily be used as a texture map to render the shadowed portion of the box. In an example, the wood plank of texture map 410 is less apparent on the wall of the box in region 490.

In various embodiments of the present invention, the distance the region is away from the camera does not necessarily specify which texture maps or which combination of texture maps are used for rendering. For example, in FIG. 4E, regions 450 and 470 are approximately the same distance away from the camera, yet region 470 may be primarily associated with a less detailed texture map (e.g. one texture map), and region 450 may be associated with a more complex texture map (e.g. three texture maps). As another example, although region 490 is closer to the camera than region 450, region 490 is associated with a less detailed texture map (e.g. two texture maps); whereas region 450 is associated with a more complex texture map (e.g. three texture maps).

Embodiments of the present invention are in contrast to traditional mipmapping strategies wherein surface texture maps for an object are subsampled to form smaller surface texture maps for the object when the object is far away from the camera. With traditional mipmapping, assuming regions 450 and 470 are assigned the same texture map, because they are the same distance from the camera, the textures of regions 450 and 470 should appear very similar, if not identical. As another example of traditional mipmapping, assuming regions 450 and 490 are assigned the same texture map, because they cover areas of different sizes in the image, the texture map used for region 490 may be subsampled to determine a lower detail, lower resolution texture map for region 450.

In light of the above, it is believed that rendered images that result from the combination of artistic looks allow users to produce images that may be less photorealistic but more artistically pleasing.

Embodiments of the present invention described above have referred to the use of images, rendered images, and the rendering of images. It should be understood that such images may simply be represented by data constructs in random access, disk memory, or the like, accordingly, the images may more broadly be termed rendered data. The rendered data may not be specifically displayed to users, but may be used by the computer in other steps in the rendering process. For example, resultant image 440, need not be an image that is directly viewable by a user or "rendered out." Instead, resultant image 440 may be input for further processing, such as if resultant image is to be used as an image within a dream sequence. As an example, resultant image 440 may desaturated, warped, framed, and the like.

Further embodiments can be envisioned to one of ordinary skill in the art after reading this disclosure. In other embodiments, combinations or sub-combinations of the above disclosed invention can be advantageously made. The block diagrams of the architecture and graphical user interfaces are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for a computer system, the method comprising:

rendering, by the computer system, an object in a scene in a first artistic style in response to a description of the object to determine a first set of rendered data;

rendering, by the computer system, the object in the scene in a second artistic style in response to the description of the object to determine a second set of rendered data;

determining a weighting image associated with the object in the scene, wherein the weighting image indicates a weighting for each of a plurality of pixels;

determining, by the computer system, a representation of the object in the scene, wherein determining the representation of the object in the scene includes applying the weighting image associated with the object in the scene to blend the first set of rendered data and the second set of rendered data;

determining, by the computer system, an image in response to the representation of the object in the scene; and outputting, from the computer system, the image to a user.

2. The method of claim 1 wherein the first artistic style is associated with a first plurality of shaders;

wherein the second artistic style is associated with a second plurality of shaders; and wherein the first plurality of shaders and the second plurality of shaders are not identical.

3. The method of claim 1 wherein the first set of rendered data comprises a displayable image; and wherein the second set of rendered data comprises a displayable image.

4. The method of claim 1 wherein a geometric model of the object used in rendering the object in the first artistic style and a geometric model of the object used in rendering the object in the second artistic style are identical.

5. The method of claim 1 further comprising:

rendering, by the computer system the scene in the first artistic style in response to a description of the scene to determine a third set of rendered data;

rendering, by the computer system, the scene in a second artistic style in response to the description of the scene to determine a fourth set of rendered data;

determining a weighting image associated with the scene; and determining, by the computer system, a representation of the scene, wherein determining the representation of the scene includes applying the weighting image associated with the scene to blend the third set of rendered data and the fourth set of rendered data;

wherein determining the image is also in response to the representation of the scene.

6. The method of claim 1 wherein the first artistic style is associated with a first set of parameters for a first shader;

wherein the second artistic style is associated with a second set of parameters for the first shader; and wherein the first set of parameters and the second set of parameters are not identical.

7. The method of claim 5 wherein a geometric model of the scene used in rendering the scene in the first artistic style and a geometric model of the scene used in rendering the scene in the second artistic style are identical.

8. The method of claim 1 further comprising:

storing a representation of the image in a tangible medium; and wherein the tangible medium is selected from a group consisting of: magnetic media, optical media, semiconductor media, print media, and film media.

9. The method of claim 1 wherein the weighting image associated with the object in the scene is determined by the computer system in response to data selected from a group consisting of: scene data, rendering data, rendered data, and a rendered image.

10. A computer system comprising:
a memory configured to store a geometric description of an object, wherein the memory is configured to store a first set of parameters associated with a first artistic look, a second set of parameters associated with a second artistic look, and a weighting image that indicates a weighting for each of a plurality of pixels; and
a processor coupled to the memory, wherein the processor is configured to determine a first set of rendered data in response to the first set of parameters and to the geometric description of the object, wherein the processor is configured to determine a second set of rendered data in response to the second set of parameters and to the geometric description of the object, and wherein the processor is configured to determine a visual representation for the object based at least in part on applying the weighting image to blend the first set of rendered data and the second set of rendered data.

11. The computer system of claim 10 wherein the memory is configured to store the weighting image determined by a user.

12. The computer system of claim 10 wherein the processor is configured to determine the weighting image.

13. The computer system of claim 10
wherein the memory is configured to store the visual representation for the object; and
wherein the computer system comprises a display coupled to the processor and to the memory, wherein the display is configured to display the visual representation for the object to a user.

14. The computer system of claim 10
wherein the first set of parameters includes a texture map; and
wherein the second set of parameters excludes the texture map.

15. The computer system of claim 10
wherein the first set of parameters includes a first texture map associated with a surface of the object;
wherein the second set of parameters includes a second texture map associated with the surface of the object;
wherein the first texture map and the second texture map do not correspond to different levels of detail in a mipmap.

16. The computer system of claim 10
wherein the first set of parameters includes a first plurality of shaders;
wherein the second set of parameters includes a second plurality of shaders;
wherein the first plurality of shaders and the second plurality of shaders are not identical.

17. A computer program product comprising a non-transitory computer-readable storage medium encoded with computer-executable code for a computer system, the computer-executable code comprising:

code configured to direct the processor to determine a first set of rendered data associated with an object in response to a first set of parameters associated with the object, and in response to a geometric description of the object;
code configured to direct the processor to determine a second set of rendered data associated with the object in response to a second set of parameters associated with the object, and in response to a geometric description of the object; and
code configured to direct the processor to determine a visual representation for the object, wherein determining the visual representation for the object includes applying a weighting image associated with the object to blend the first set of rendered data and the second set of rendered data, wherein the weighting image indicates a weighting for each of a plurality of pixels.

18. The computer program product of claim 17 wherein the computer-executable code further comprises:
code configured to direct the processor to retrieve the weighting image from a memory, wherein the weighing image is determined by a user.

19. The computer program product of claim 17 wherein the computer-executable code further comprises:
code configured to direct the processor to determine the weighing image.

20. The computer program product of claim 17 wherein the computer-executable code further comprises:
code configured to direct the processor to store the visual representation for the object in a tangible medium;
wherein the tangible medium is selected from a group consisting of: optical-storage media, magnetic-storage media, semiconductor-storage media, and film media.

21. The computer program product of claim 17
wherein the first set of parameters includes a texture map; and
wherein the second set of parameters excludes the texture map.

22. The computer program product of claim 17
wherein the first set of parameters includes a first plurality of shaders;
wherein the second set of parameters includes a second plurality of shaders;
wherein the first plurality of shaders and the second plurality of shaders are not identical.

23. The computer system of claim 12 wherein the processor is further configured to determine the weighting image based at least in part on one or more of a scene model parameter or an image metric.

24. The computer program product of claim 17 wherein the computer-executable code further comprises:
code configured to direct the processor to determine the weighing image based at least in part on one or more of a scene model parameter or an image metric.

* * * * *